United States Patent
Shiga

(10) Patent No.: US 7,415,514 B2
(45) Date of Patent: Aug. 19, 2008

(54) METHOD AND SYSTEM FOR PROVIDING AND UTILIZING TOTAL PACKAGE PROGRAM WITH ADVERTISEMENT

(75) Inventor: Ichiyou Shiga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1058 days.

(21) Appl. No.: 09/947,760

(22) Filed: Sep. 7, 2001

(65) Prior Publication Data

US 2002/0194254 A1   Dec. 19, 2002

(51) Int. Cl.
*G06F 15/173* (2006.01)
(52) U.S. Cl. .................. 709/223; 709/224; 709/231; 709/232
(58) Field of Classification Search ............... 709/223, 709/231, 224, 232
See application file for complete search history.

(56) References Cited

U.S. PATENT DOCUMENTS

| | | | | |
|---|---|---|---|---|
| 6,486,920 | B2* | 11/2002 | Arai et al. ............... | 348/563 |
| 6,704,930 | B1* | 3/2004 | Eldering et al. ........... | 725/36 |
| 2001/0023433 | A1* | 9/2001 | Natsubori et al. ......... | 709/207 |
| 2002/0104090 | A1* | 8/2002 | Stettner .................... | 725/60 |
| 2002/0161633 | A1* | 10/2002 | Jacob et al. ............... | 705/14 |
| 2002/0184623 | A1* | 12/2002 | Hodge et al. .............. | 725/37 |
| 2004/0181801 | A1* | 9/2004 | Hagen et al. .............. | 725/32 |
| 2004/0205829 | A1* | 10/2004 | Hane ......................... | 725/135 |
| 2004/0255322 | A1* | 12/2004 | Meadows et al. ......... | 725/23 |
| 2006/0095939 | A1* | 5/2006 | Jutzi ......................... | 725/78 |

FOREIGN PATENT DOCUMENTS

| | | |
|---|---|---|
| EP | 0 865 205 | 9/1998 |
| JP | 2001-243328 | 9/2001 |
| WO | WO94/14280 | 7/1996 |
| WO | WO95/15657 | 6/1997 |

OTHER PUBLICATIONS

Japanese Office Action issued on Aug. 14, 2006 in Japanese Application No. 2001-174332.

* cited by examiner

*Primary Examiner*—John Follansbee
*Assistant Examiner*—Nghi V Tran
(74) *Attorney, Agent, or Firm*—Staas & Halsey LLP

(57) ABSTRACT

The invention makes it possible for a broadcasting station to easily obtain a total package program with advertisement constituted by a broadcast program and advertisement. A contents holder 200 registers a broadcasting program 210 on a condition that a royalty is to be paid for it when selected by an advertiser 300. An advertiser 300 selects an arbitrary broadcasting program 210 and registers broadcasting area information, broadcasting period information, and information regarding an advertisement in correspondence with the broadcasting program on a charged basis, thereby producing a total package program with advertisement 110. If a distribution request including at least identification information of a total package program 110 with advertisement, identification information of a broadcasting station 500, and information regarding a scheduled broadcasting time is received from the broadcasting station 500 for example, it is judged whether the distribution request satisfies conditions for a broadcasting area and a broadcasting period. If it is judged that the conditions are satisfied, the total package program 110 with advertisement specified by the distribution request is provided to the broadcasting station 500 specified by the distribution request on a free-of-charge basis.

24 Claims, 9 Drawing Sheets

| PROGRAM INFORMATION | | ADVERTISEMENT INFORMATION | | | | ID OF TOTAL PACKAGE PROGRAM WITH ADVERTISEMENT | DISTRIBUTION REQUEST 1 | | | DISTRIBUTION REQUEST 2 |
|---|---|---|---|---|---|---|---|---|---|---|
| CONTENTS HOLDER ID | PROGRAM ID | ADVERTISER ID | BROADCASTING AREA CODE | BROADCASTING PERIOD | ADVERTISEMENT CONTENTS ID | | BROADCASTING STATION ID | BROADCASTING AREA | SCHEDULED BROADCASTING DATE AND TIME | |
| ABC | 001 | XYZ | 000 | 2001/05/01 ~ 2001/05/31 | X001 | ABC001 | DEF | 100 | 2001/05/05 20:00~20:54 | ---- |
| ---- | ---- | ---- | ---- | ---- | ---- | ---- | ---- | ---- | ---- | ---- |

FIG. 6

| PROGRAM ADVERTISEMENT FRAME INFORMATION | | | |
|---|---|---|---|
| BROADCASTING STATION ID | PROGRAM ADVERTISEMENT FRAME ID | SCHEDULED BROADCASTING DATE AND TIME | BROADCASTING AREA |
| DEF | D999 | 2001/05/24 20:00~20:54 | 100 |
| ---- | ---- | ---- | ---- |

| ADVERTISEMENT INFORMATION | | |
|---|---|---|
| OPTION FOR TOTAL PACKAGE PROGRAM WITH ADVERTISEMENT (YES:○/NO:×) | ADVERTISER ID | PROGRAM FRAME ADVERTISEMENT CONTENTS ID |
| ○ | pqr | P001 |
| ---- | ---- | ---- |

FIG. 9

METHOD AND SYSTEM FOR PROVIDING AND UTILIZING TOTAL PACKAGE PROGRAM WITH ADVERTISEMENT

TECHNICAL FIELD OF THE INVENTION

The present invention relates to a technology for distributing broadcasting contents.

BACKGROUND OF THE INVENTION

Broadcasting stations have broadcasted their programs so far in a manner as shown in FIG. 11. Specifically, a broadcasting station 3000 obtains program contents 1100 (step (2)) by purchasing a right to use the program contents 1100 from a contents holder 1000 who holds the program contents 1100 (step (1)). The contents holder 1000 is an enterprise such as a program producing company who holds contents data of programs. The broadcasting station 3000 sells an advertisement frame set for the program in which the program contents 1100 are broadcasted, to an advertiser 2000 (step (3)) to obtain advertisement contents 2100 (step(4)). The broadcasting station 3000 mixes the program contents 1100 and advertisement contents 2100. For example, program contents 1100 for 50 minutes and advertisement contents for 10 minutes in total are mixed to produce a program package to be broadcasted for one hour (step (5)), and the program contents 1100 and advertisement contents 2100 are broadcasted from an antenna 3100 (step (6)). For example, techniques for mixing and broadcast or distribution are disclosed in WO94/14280 and WO95/15657 publications. Then, the program contents 1100 and advertisement contents 2100 are received at a viewer's house 4000 through an antenna 4100 and are reproduced by a digital broadcasting receiver 4200. An advertisement frame may be sold to an advertising agent instead of an advertiser 2000. As described with reference to FIG. 11, man power has been required at a broadcasting station to acquire program contents and to sell advertisement frames.

There is a trend toward multi-channel broadcasting as well as digitalization. However, since not so much increase is expected in the amount of program contents and advertisement, broadcasting stations may not be able to obtain a required amount of program contents and advertisement if the current situation continues.

SUMMARY OF THE INVENTION

Therefore, an object of the invention is to provide a technology for allowing a broadcasting station to easily obtain a total package program with advertisement which is comprised of a broadcasting program and advertisement.

According to a first aspect of the invention, a method for providing a total package program with advertisement which is to be carried out by a contents distribution center for example, includes steps of: registering a broadcasting program, producing a total package program with advertisement by registering broadcasting area information, broadcasting period information, and information regarding the advertisement specified by an advertiser in correspondence with an arbitrary broadcasting program selected by the advertiser, judging whether a distribution request satisfies a condition regarding a broadcasting area and a broadcasting period if the distribution request is received, wherein the distribution request includes at least identification information of a total package program with advertisement, identification information of a broadcasting station, and information on a scheduled broadcasting time, and determining to provide the total package program with advertisement specified in the distribution request to the broadcasting station specified in the distribution request if it is judged in the judging step that the condition is satisfied.

As thus described, total package programs with advertisement which are combinations of broadcasting programs and advertisement are prepared at the contents distribution center, and the broadcasting station can be provided with a total package program with advertisement if it is judged that the distribution request by the broadcasting station satisfies a condition for the broadcasting area and the broadcasting period. That is, the broadcasting station can easily obtain advertisement and a broadcasting program.

For example, a contents holder registers a broadcasting program on a condition that a royalty is to be paid for the program when selected by an advertiser. An advertiser selects an arbitrary broadcasting program and registers broadcasting area information, broadcasting period information, and information regarding the advertisement in correspondence with the broadcasting program on a charged basis, thereby producing a total package program with advertisement. If a distribution request including at least identification information of a total package program with advertisement, identification information of a broadcasting station, and information regarding a scheduled broadcasting time is received from the broadcasting station, it is judged whether the distribution request satisfies a condition for the broadcasting area and the broadcasting period. If it is judged that the condition is satisfied, the total package program with advertisement specified in the distribution request is provided to the broadcasting station specified in the distribution request on a free-of-charge basis, for example.

The above-mentioned condition for the broadcasting area and the broadcasting period may be a condition that information on the scheduled broadcasting period included in the distribution request may not contradict broadcasting period information registered in correspondence with the total package program with advertisement specified in the distribution request and the broadcasting area of the broadcasting station designated in the distribution request may not contradict broadcasting area information registered in correspondence with the total package program with advertisement specified in the distribution request.

If such a condition is not satisfied, the distribution request is rejected because it is not intended to broadcast the total package program with advertisement in such a condition specified in the distribution request.

The above-described conditions for the broadcasting area and the broadcasting period may be a condition that the scheduled broadcasting time and the broadcasting area of the broadcasting station for a distribution request, may not conflict with the scheduled broadcasting time and the broadcasting area of the broadcasting station for any preceding distribution request if it has already been determined to provide the total package program with advertisement specified by the later distribution request in accordance with the preceding distribution request. The purpose is to prevent similar broadcasting schedules from being planned for similar broadcasting areas.

According to a second aspect of the invention, a method for utilizing a total package program with advertisement which is to be carried out by a broadcasting station includes the steps of: transmitting a distribution request including identification information of a total package program with advertisement which is a combination of a broadcasting program and advertisement, identification information of a broadcasting station, and information regarding a scheduled broadcasting time to a computer for providing the total package program with advertisement, receiving broadcasting information, in which contents information of advertisement for the total package program with advertisement is inserted into contents information of the broadcasting program for the total package program with advertisement specified in the distribution request, from the computer if the distribution of the total package program with advertisement is possible; and broadcasting the broadcasting information.

As thus described, the broadcasting station can obtain broadcasting information in which contents information of advertisement is inserted into contents information of a corresponding broadcasting program and can broadcast it.

The above-described method can be also implemented by a dedicated program which may be installed into computer hardware. In this case, the program is stored in a storage medium or storage device such as a flexible disk, CD-ROM, magneto-optical disk, semiconductor memory or hard disk. It may be also distributed over a network. Results of intermediate processes are temporarily stored in a memory.

BRIEF DESCRIPTION OF THE DRAWINGS

FIG. 6 shows an example of data stored in a total package program information database;

FIG. 9 shows an example of data stored in a program advertisement frame database;

DETAILED DESCRIPTION OF THE PREFERRED EMBODIMENT

Figure 1:
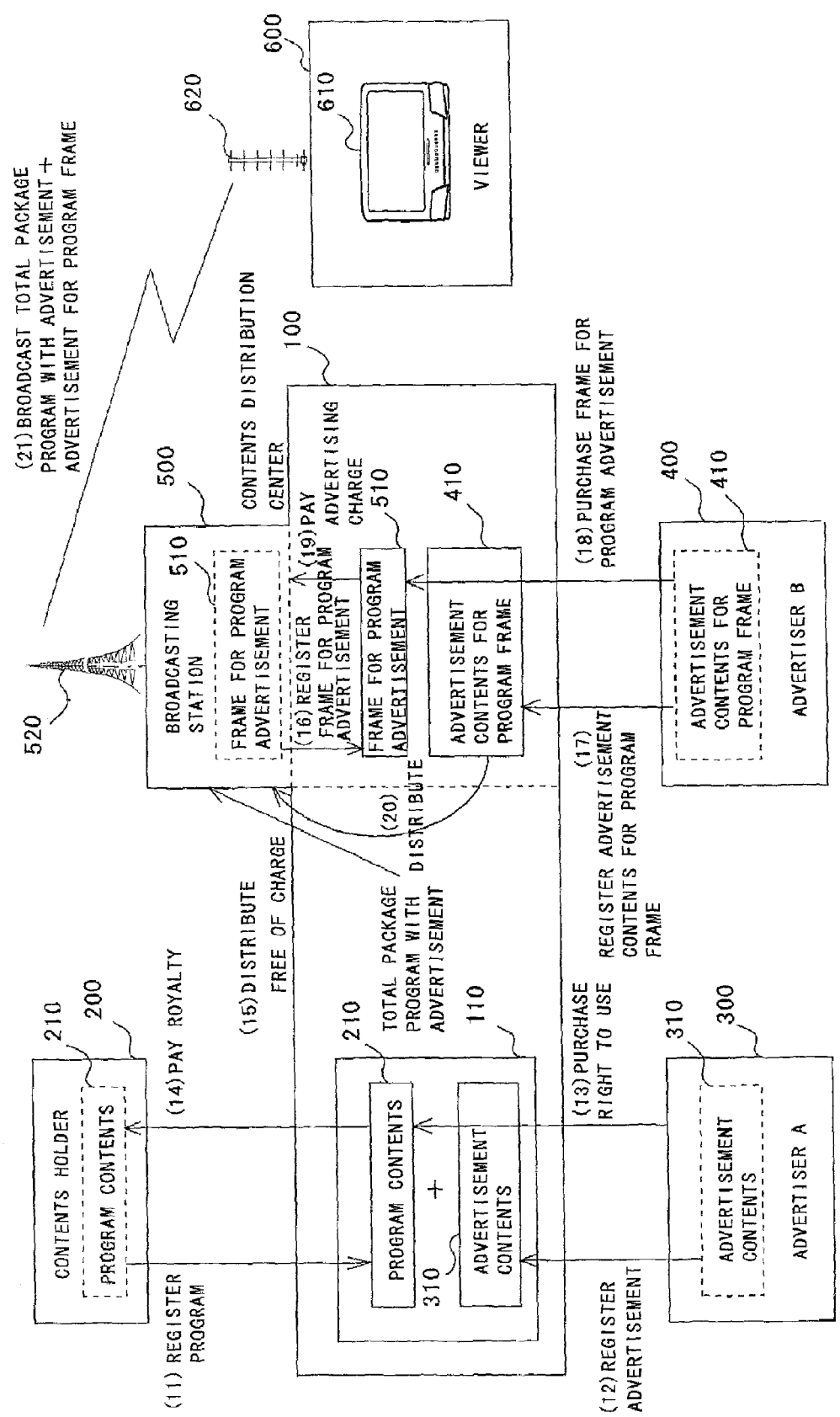
FIG. 1 is a schematic diagram illustrating a business model according to an embodiment of the present invention.

For better understanding of an embodiment of the invention, a business model will be described with reference to FIGS. 1 through 3. In the present embodiment a contents distribution center 100 is newly provided. The contents distribution center 100 accepts registration of program contents 210 by a contents holder 200 (step (11)). However, no payment is made at when the registration is carried out. The contents distribution center 100 also sells a right to use the program contents 210 to advertisers. Here, an advertiser A (300) buys the right to use the program contents 210 and registers advertisement contents 310 to be broadcasted with the program contents 210 to the contents distribution center 100 (steps (12) and (13)). The advertiser A(300) also registers information on the area and period for the broadcast of the advertisement when buying this right. The contents distribution center 100 receives a royalty for the program contents 210 from the advertiser A(300) and pays a royalty to the contents holder 200 (step (14)). The contents distribution center 100 earns portion of the royalty obtained from the advertiser A. Thus, a total package 110 with advertisement is produced by combining a registered broadcasting program with advertisement.

A broadcasting station 500 requests the contents distribution center 100 to distribute a total package program with advertisement based on their own schedule for broadcasting. The distribution request includes at least information identifying the total package program with advertisement, information identifying the broadcasting station 500, and information on a scheduled broadcasting time. The contents distribution center 100 checks whether there is any contradiction between the broadcasting area of the broadcasting station 500 and the broadcasting area set for the advertisement included in the total package program 110 with advertisement and whether there is any contradiction between the scheduled broadcasting time and the broadcasting period set for the advertisement included in the total package program 110 with advertisement. If a distribution schedule according to the preceding distribution request has already been registered for the total package program with advertisement specified by the distribution request, it is checked whether there is any conflict between the broadcasting area and broadcasting time according to the distribution schedule and the broadcasting area and broadcasting time according to the this distribution request.

If the contents distribution center judges that there is no problem as a result of the above-described checks, information on the total package program 110 with advertisement specified by the distribution request is distributed to the broadcasting station 500 on a free-of-charge basis (step (15)). The distribution from the contents distribution center 100 is carried out in a form in which the advertisement contents 310 are incorporated into advertisement sections (may also be called advertising time zones) of the program contents 210. The broadcasting station 500 needs to simply broadcast the distributed total package program 110 with advertisement. However, the broadcasting station 500 can not obtain any income only by broadcasting the total package program 110 with advertisement.

Therefore, for example, the broadcasting station 500 sets frames 510 for program advertisements and registers them to the contents distribution center 100 (step (16)). For example, a frame 510 for the program advertisement is like a frame for a banner advertisement. This is, however, not limiting the present invention. On the other hand, an advertiser B(400) buys a frame 510 for the program advertisement and registers advertisement contents 410 for the program frame to the contents distribution center 100 (steps (17) and (18)). The advertising charge for the frame 510, which has been paid to the contents distribution center 100, is paid to the broadcasting station 500 (step (19)). The contents distribution center 100 distributes the advertisement contents 410 registered for the frame 510 to the broadcasting station 500 (step (20)).

The frame 510 for the program advertisement may be sold by the contents distribution center 100 or by the broadcasting station 500 itself. For this reason, the frame 510 for the program advertisement and advertisement contents 410 for the program frame are enclosed by dotted lines in FIG. 1.

Thus, the broadcasting station 500 broadcasts broadcasting information of the total package program 110 with advertisement and information on the advertisement contents 410 for the program frame through an antenna 520 (step (21)). At a viewer's house 600, the broadcasting information of the total package program 110 with advertisement and the information on the advertisement contents 410 for the program frame is received through an antenna 620. For example, a screen of a digital broadcasting receiver 610 displays as shown in FIG. 2.

Figure 2:
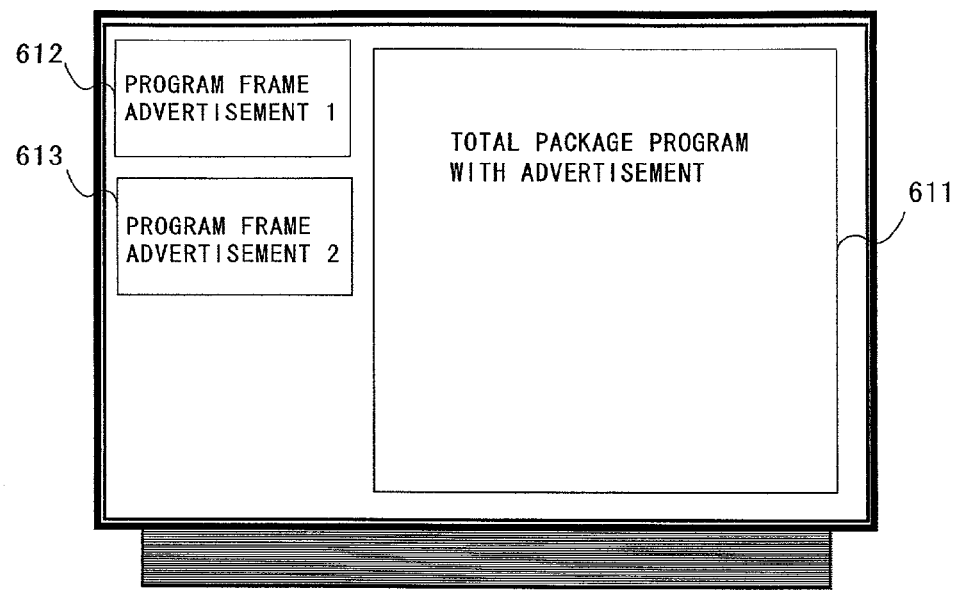
FIG. 2 is an illustration of display example of a digital broadcasting receiver.

In FIG. 2, provided are a display section 611 for the total package program with advertisement, a display section 612 for a program frame advertisement 1, and a display section 613 for a program frame advertisement 2. A configuration may be employed in which the program frame advertisements 1 and 2 are displayed in separate display sections as thus described. An alternative configuration may be employed in which advertisements can be inserted into a part of the advertising time of the total package program instead of inserting advertisement contents into all of advertising sections (i.e. advertising time zones) of the program contents. That is, the program frame advertisements 1 and 2 may be inserted into the part of the advertising time zones.

Figure 3:
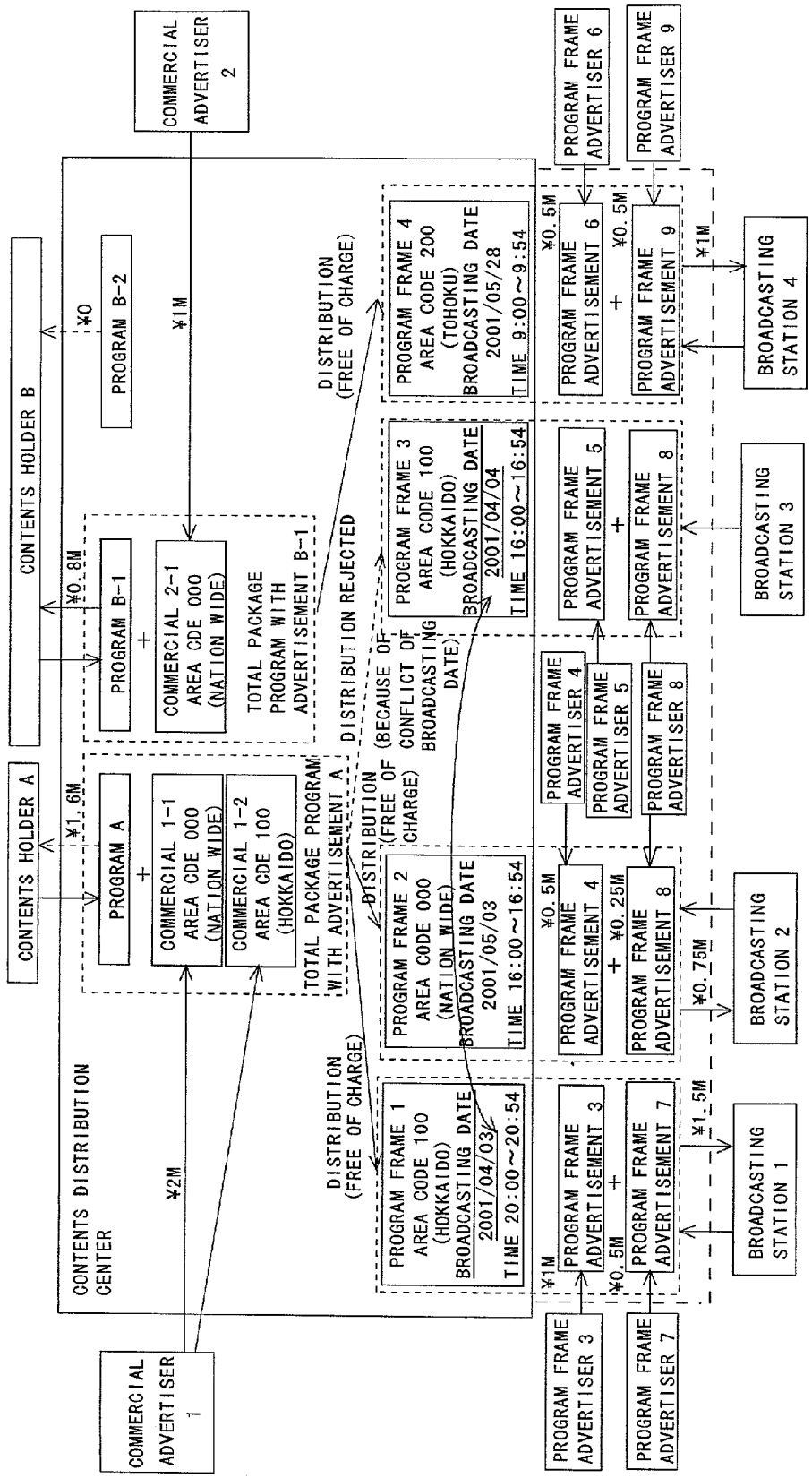
FIG. 3 is an illustration for explaining the business model according to the embodiment of the present invention.

FIG. 3 shows a more specific example. In the example shown in FIG. 3, the contents holder A registers a program A to the contents distribution center. The contents holder A can not obtain a royalty only by registering the contents. A commercial advertiser 1 buys a right to use the program A and registers commercials 1-1 and 1-2 for the program A. At this time, the commercial advertiser 1 pays 2 million yen to the contents distribution center as a royalty for the program A. An area code 000 for nationwide broadcasting is registered for the commercial 1-1. Meanwhile, an area code 100 for Hokkaido is registered for the commercial 1-2. Although here is not shown, broadcasting periods are also registered. The program A and the commercial 1-1 and 1-2 form a total package program A with advertisement. An alternative configuration may be employed to provide separate combinations, i.e., a total package program A-1 with advertisement which is a combination of the program A and the commercial 1-1 and a total package program A-2 with advertisement which is a combination of the program A and the commercial 1-2. Since the commercials 1-1 and 1-2 are registered for the program A, a royalty of 1.6 million yen is paid to the contents holder A. For example, the contents distribution center receives the remaining 0.4 million yen as a commission.

On the other hand, a contents holder B registers programs B-1 and B-2. A commercial advertiser 2 registers commercial 2-1 for the program B-1. At this time, the commercial advertiser 2 pays 1 million yen to the contents distribution center as a royalty for the program B-1. An area code 000 for nationwide broadcasting is registered for the advertisement 2-1. Although here is not shown, a broadcasting period is also registered. The program B-1 and the commercial 2-1 form a total package program B-1 with commercial. Since the commercial 2-1 is registered for the program B-1, a royalty of 0.8 million yen is paid to the contents holder B. However, since no commercial is registered for the program B-2, no payment is made for the program B-2. For example, the remaining 0.2 million yen is received by the contents distribution center as a commission.

When a total package program with advertisement is produced, it is disclosed to the broadcasting station. If it satisfies predetermined conditions, contents information of the broadcasting program for the total package program with advertisement and advertisement contents information for the commercial is distributed to the broadcasting station on a free-of-charge basis according to a distribution request from the broadcasting station. A case is shown here wherein a broadcasting station 1, which is the mass media, requests distribution of the total package program A with advertisement. The broadcasting station 1 plans to broadcast it in a program frame 1 which is assigned the area code 100 (Hokkaido), scheduled to be broadcasted on Apr. 3, 2001 from 20:00 to 20:54. The area code 100 (Hokkaido) is also registered as a broadcasting area for the commercial 1-2 of the total package program A with advertisement, and the broadcasting period for the commercial 1-2 also includes the scheduled broadcast date, although not shown. Therefore, the distribution of the total package program A with advertisement to the broadcasting station 1 is allowed.

There is also shown a case wherein a broadcasting station 2, which is the mass media, requests distribution of the total package program A with advertisement. The broadcasting station 2 plans to broadcast it in a program frame 2 which is assigned the area code 000 (nationwide), scheduled to be broadcasted on May 3, 2001 from 16:00 to 16:54. The area code 000 (nationwide) is also registered as a broadcasting area for the commercial 1-1 of the total package program A with advertisement, and the broadcasting period of the commercial 1-1 also includes the scheduled broadcasting date, although not shown. Therefore, the distribution of the total package program A with advertisement to the broadcasting station 2 is authorized.

Another case is also shown wherein a broadcasting station 3, which is the mass media, requests distribution of the total package program A with advertisement. The requirement of the broadcasting station 3 is to broadcast it in a program frame 3 which is assigned the area code 100 (Hokkaido), scheduled to be broadcasted on Apr. 4, 2001 from 16:00 to 16:54. The area code 100 (Hokkaido) is also registered as a broadcasting area for the commercial 1-2 of the total package program A with advertisement, and the broadcasting period of the commercial 1-2 also includes the scheduled broadcasting date, although not shown. It is therefore apparent that the first condition for the distribution of the total package program A with advertisement to the broadcasting station 3 is satisfied. However, since a distribution reservation for the total package program A with advertisement has already been made by the broadcasting station 1, and the scheduled broadcasting dates are April 3 and 4 which are very close. In the present embodiment, for example, it is judged that there is a conflict of broadcasting dates if the same programs are broadcasted within seven days, and the later distribution request is not allowed. That is, the distribution request from the broadcasting station 3 is not accepted, and the broadcasting information for the total package program A with advertisement is not transmitted to the broadcasting station 3.

A broadcasting station 4, which is the mass media, requests the contents distribution center to distribute the total package program B with advertisement. The requirement of the broadcasting station 4 is to broadcast it in a program frame 4 which is assigned an area code 200 (Tohoku), scheduled to be broadcasted on May 28, 2001 from 9:00 to 9:54. The area code 000 indicating nationwide broadcasting is also registered as a broadcasting area for the commercial 2-1 of the total package program B with advertisement, and the broadcasting period of the commercial 2-1 also includes the scheduled broadcasting date, although not shown. Therefore, the distribution of the total package program B with advertisement to the broadcasting station 4 is allowed.

A broadcasting station can not only receive distribution of total package programs with advertisement on a free-of-charge basis but also sell frames of the program advertisements through the contents distribution center. In the example shown in FIG. 3, it is assumed that two frames are set for each program frame. The program frame advertiser 3 buys the first frame for the program advertisement set for the total package program A with advertisement broadcasted by the broadcasting station 1 and pays 1 million yen to the contents distribution center as an advertisement charge. It also registers a program frame advertisement 3 to be broadcasted in the frame for the program advertisement to the contents distribution center. Contents information of the program frame advertisement 3 is transmitted from the contents distribution center to the broadcasting station 1.

A program frame advertiser 7 buys the second frame set for the total package program A with advertisement broadcasted by the broadcasting station 1 and pays 0.5 million yen to the contents distribution center as an advertisement charge. It also registers a program frame advertisement 7 to be broadcasted in the frame for the program advertisement to the contents distribution center. Contents information of the program frame advertisement 7 is transmitted from the contents distribution center to the broadcasting station 1. 1.5 million yen is paid to the broadcasting station 1 as an advertisement charge.

Similarly, a program frame advertiser 4 buys the first frame set for the total package program A with advertisement which will be broadcasted by the broadcasting station 2, and pays 0.5 million yen to the contents distribution center as an advertisement charge. It also registers a program frame advertisement 4 to be broadcasted in the frame for the program advertisement to the contents distribution center. Contents information of the program frame advertisement 4 is transmitted from the contents distribution center to the broadcasting station 2.

A program frame advertiser 8 buys the second frame set for the total package program A with advertisement, which will be broadcasted by the broadcasting station 2 and pays 0.25 million yen to the contents distribution center as an advertisement charge. It also registers a program frame advertisement 8 to be broadcasted in the frame for the program advertisement to the contents distribution center. Contents information of the program frame advertisement 8 is transmitted from the contents distribution center to the broadcasting station 2. 0.75 million yen is paid to the broadcasting station 2 as an advertisement charge.

The program frame advertisers 5 and 8 buy the frames set for the program frame 3 of the broadcasting station 3 and respectively register program frame advertisements 5 and 8 to the contents distribution center. However, the total package program with advertisement to be broadcasted in the program frame 3 has not been determined yet. In this case, the contents distribution center may accept only reservations for the purchase of frames for the program advertisement, and payments from the program frame advertisers 5 and 8 and registration of program frame advertisements may be made after the total package program is determined and the reservations become effective.

A program frame advertiser 6 buys the first frame set for the total package program B with advertisement, which will be broadcasted by the broadcasting station 4 and pays 0.5 million yen to the contents distribution center as an advertisement charge. It also registers a program frame advertisement 6 to be broadcasted in the frame for the program advertisement to the contents distribution center. Contents information of the program frame advertisement 6 is transmitted from the contents distribution center to the broadcasting station 4.

A program frame advertiser 9 buys the second frame set for the total package program B with advertisement, which will be broadcasted by the broadcasting station 4 and pays 0.5 million yen to the contents distribution center as an advertisement charge. It also registers a program frame advertisement 9 to be broadcasted in the frame for the program advertisement to the contents distribution center. Contents information of the program frame advertisement 9 is transmitted from the contents distribution center to the broadcasting station 4. 1 million yen is paid to the broadcasting station 4 as an advertising charge.

As described above with reference to FIG. 1, an alternative configuration may be employed in which each broadcasting station sells frames for program advertisements by itself instead of consigning the sale of them to the contents distribution center.

Figure 4:
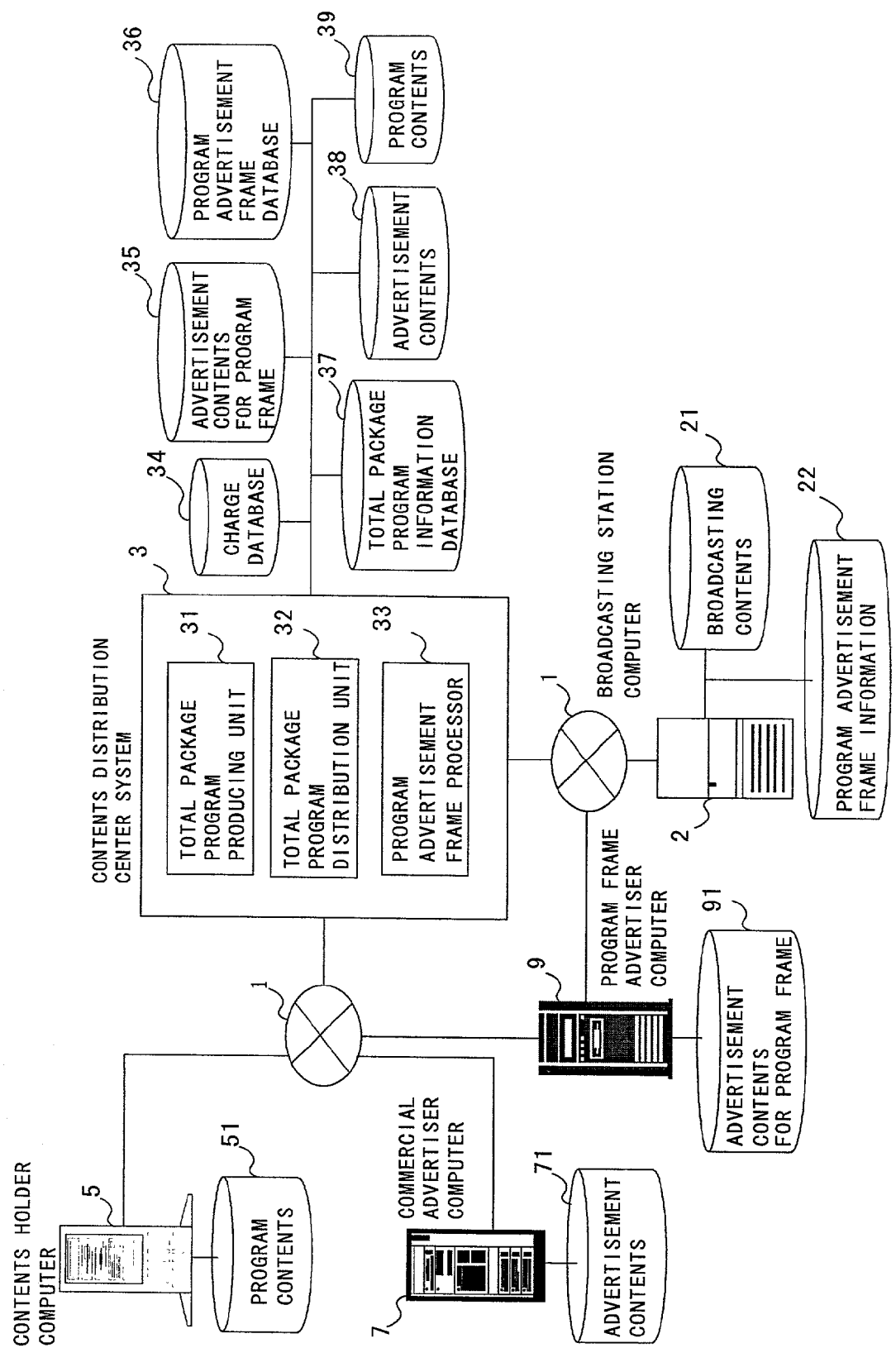
FIG. 4 is a schematic diagram of a system according to the embodiment of the present invention.

FIG. 4 schematically shows a system used for carrying out the above-described business model. The contents distribution center system 3 is connected to a network such as a public network 1 to which one or a plurality of contents holder computers 5, one or a plurality of commercial advertiser computers 7, and one or a plurality of program frame advertiser computers 9, and one or a plurality of broadcasting station computers 2.

The contents holder computer 5 manages a program contents storage unit 51 for storing program contents of broadcasting programs to be registered to the contents distribution center. The commercial advertiser computer 7 manages a advertisement contents storage unit 71 for storing contents information of advertisement to be registered to the contents distribution center. The program advertiser computer 9 manages a program frame advertisement contents storage unit 91 for storing information on advertisement contents of program frame to be registered to the contents distribution center or a broadcasting station. The broadcasting station computer 2 manages a broadcasting contents storage unit 21 for storing information on program contents and information on advertisement contents, and a program advertisement frame information storage unit 22 for storing information regarding program advertisement frames.

The contents distribution center system 3 includes a total package program producing unit 31 for producing total package programs with advertisement, a total package program distribution unit 32 which includes a VOD (video on demand) server and which distributes the total package programs with advertisement to the broadcasting station computers 2, and a program advertisement frame processor 33 for performing processing associated with the registration and sale of program advertisement frames and so on. It also manages a charge database 34 in which billing to advertisers and payments to contents providers is recorded, a program frame advertisement contents storage unit 35 for storing contents information of registered program frame advertisement, a program advertisement frame database 36 for storing information on the frames for program advertisements, a total package program information database 37 for storing information on registered broadcasting programs, an advertisement contents storage unit 38 for storing contents information of registered advertisements, and a program contents storage unit 39 for storing contents information of the registered broadcasting programs.

Figure 5:
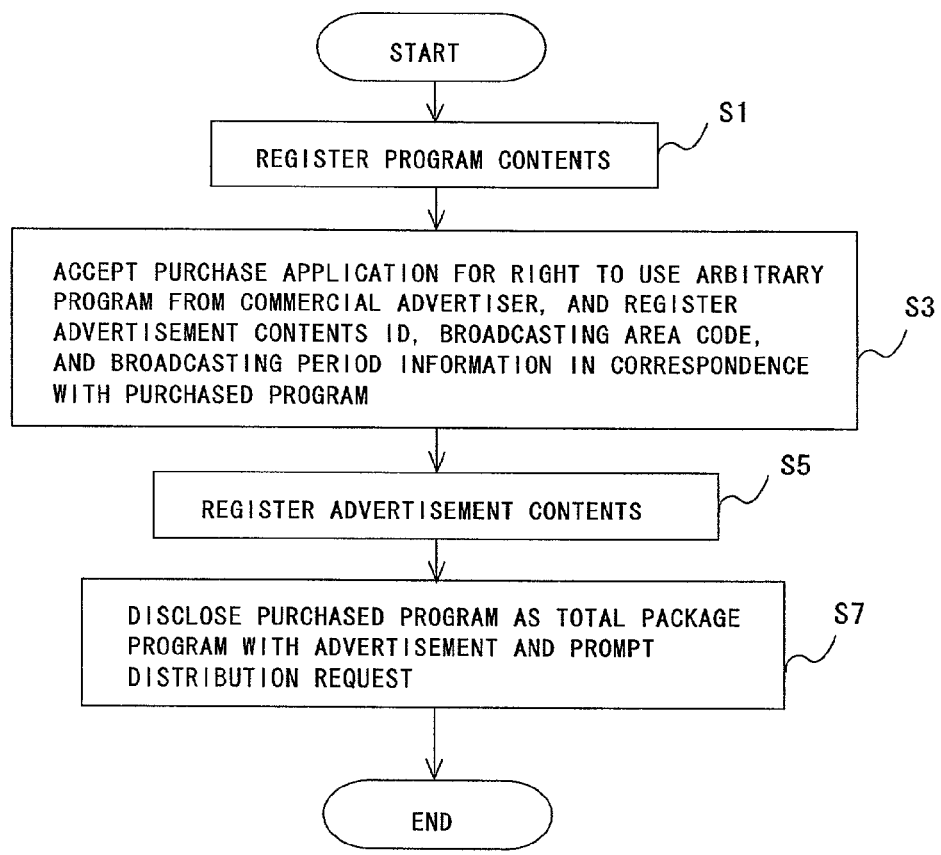
FIG. 5 is an illustration of an example of a first processing flow at a contents distribution center system.

An operation of the system shown in FIG. 4 will now be described with reference to FIGS. 5 through 10. FIG. 5 shows a processing flow performed mainly by the total package program producing unit 31 of the contents distribution center system 3. First, the total package program producing unit 31 registers program contents (step S1). The program contents are stored into the program contents storage unit 39. Here, program contents read by the contents holder computers 5 from the program contents storage unit 51 may be received by the total package program producing unit 31 through the public network 1 or the like. An alternative configuration may be employed in which program contents obtained from the contents holders on an off-line basis are stored into the program contents storage unit 39 by the total package program producing unit 31.

For example, the total package program producing unit 31 registers not only program contents but also program information including contents holder ID and program ID into the total package program information database 37. For example, program contents stored in the program contents storage unit 39 are identified by using a program ID. FIG. 6 shows an example of the total package program information database 37. In the example of FIG. 6, contents holder ID and program ID are stored as program information. When a certain advertiser buys a right to use program contents, the advertiser ID, broadcasting area code, broadcasting period, and advertisement contents ID are stored as advertisement information. When a total package program with advertisement is produced, an ID is assigned to the total package program with advertisement, and this ID is stored. Further, when distribution is allowed for a distribution request from a broadcasting station, information on the broadcasting station ID, broadcasting area, and scheduled broadcasting date and time is stored as information for a distribution request 1. If distribution is allowed for a plurality of distribution requests, plural columns for the distribution requests are provided. The program information may include information such as contents holder names and description of program contents.

When program contents are registered, at least a part of the program contents are disclosed to commercial advertisers. This allows the commercial advertisers to find a broadcasting program to buy. For example, the disclosure of program contents may be carried out using at a Web server (not shown) in the contents distribution center system 3.

Next, the total package program producing unit 31 receives an application for purchase of a right to use an arbitrary program from a commercial advertiser, and registers the advertisement contents ID, broadcasting area code, and broadcasting period information in correspondence with the purchased program(step S3). For example, a configuration may be employed in which the web server (not shown) of the contents distribution center system 3 receives an application for purchase of a right to use a program from an commercial advertiser computer 7 and in which the advertisement contents ID, broadcasting area code, and broadcasting period information are received from the commercial advertiser computer 7 through the public network 1 or the like and registered by the total package program producing unit 31 into the total package program information database 37. Alternatively, an application for purchase of a right to use a program may be accepted off-line, and the advertisement contents ID, broadcasting area code, and broadcasting period information may be registered by the total package program producing unit 31 into the total package program information database 37. The contents information of an advertisement is identified by an advertisement contents ID. In the example shown in FIG. 6, an advertiser ID is also registered. An ID is also assigned to a total package program with advertisement and are stored into the total package program information database 37.

The total package program producing unit 31 stores advertisement contents into the advertisement contents storage unit 38 (step S5). For example, advertisement contents information read by an commercial advertiser computer 7 from the advertisement contents storage unit 71 may be received by the total package program producing unit 31 through a public network 1 or the like and stored into the advertisement contents storage unit 38. An alternative configuration may be employed in which advertisement contents are received from an commercial advertiser on an off-line basis and are stored by the total package program producing unit 31 into the advertisement contents storage unit 38.

Then, the contents distribution center system 3 discloses programs bought by any commercial advertisers to broadcasting stations as total package programs with advertisement and prompts to input or send distribution requests (step S7). For example, the contents distribution center system 3 maintains the total package programs with advertisement in a searchable state to allow the broadcasting stations to find a desired total package program with advertisement. For example, an arrangement may be made such that a total package program with advertisement can be searched based on the broadcasting period, broadcasting area, advertiser, program contents, and so on.

Total package programs with advertisement are thus produced and disclosed to broadcasting stations. A broadcasting station can receive distribution of a total package program with advertisement it has selected if the conditions described below are satisfied.

A description will now be made with reference to FIG. 7 on a processing flow performed mainly by the total package program distribution unit 32 of the contents distribution center system 3. First, the total package program distribution unit 32 receives a distribution request including a broadcasting station ID, an ID of a selected total package program with advertisement, and information on a scheduled broadcasting date and time (or information on a program frame) from a broadcasting station computer 2 (step S11). The information of the distribution request thus received is temporarily stored in a storage device. A distribution request may be received off-line and input to the total package program distribution unit 32 instead of being received from a broadcasting station computer 2 through the public network 1 or the like. Information on a broadcasting area may be included in a distribution request. However, there is no need for including information on a broadcasting area in a distribution request if information on the broadcasting area of each broadcasting station is registered in the contents distribution center system 3 in advance.

Next, the total package program distribution unit 32 compares the broadcasting area of the broadcasting station which has requested distribution and the broadcasting area code of advertisements set for the total package program with advertisement, which is specified by the distribution request, and the broadcasting date and time specified by the distribution request with the information on the broadcasting period of the advertisements set for the total package program with advertisement, which is specified by the distribution request (step S13). If the broadcasting area code of the advertisements set for the total package program with advertisement, which is specified by the distribution request, does not correspond to the broadcasting area of the broadcasting station or does not include the broadcasting area of the broadcasting station or if the broadcasting period information of the advertisements set for the total package program with advertisement, which is specified by the distribution request, does not correspond to the scheduled broadcasting date and time specified by the distribution request or does not include the scheduled date and time ("No" route at step 15), the total package program with advertisement can not be distributed to the broadcasting station requesting the distribution. Therefore, the broadcasting station is notified of the rejection of distribution (step S25). The distribution rejection notice may be transmitted to the broadcasting station computer 2 through the public network 1 for example, or the notice may be sent to the broadcasting station by other means.

If the broadcasting area code of the advertisements set for the total package program with advertisement, which is specified by the distribution request, corresponds to or includes the broadcasting area of the broadcasting station and the broadcasting period information of the advertisement set for the total package program with advertisement, which is specified by the distribution request, corresponds to or includes the scheduled broadcasting date and time specified by the distribution request ("Yes" route at step S15), the total package program distribution unit 32 checks whether any preceding distribution for the same total package program with advertisement request has already been registered to the similar area and the scheduled broadcasting date and time specified by this distribution request are within a predetermined period around the broadcast date and time of the preceding distribution request (also called reserved distribution)(step S17). For example, if a total package program information database 37 as shown in FIG. 6 is provided, the check at step S17 is carried out using the information of the broadcasting area and the information of the scheduled broadcasting date and time in the preceding distribution request.

If the conditions at step S17 are satisfied, that is, if there is any conflict between the distribution requests ("Yes" route at step S19), the process proceeds to step S25. On the other hand, if the conditions at step S17 are not satisfied or if there is no conflict between the distribution requests ("No" route at step S19), the total package program distribution unit 32 registers the received distribution request into the total package program information database 37 (step S21). In the example of FIG. 6, the broadcasting station ID, broadcasting area, and scheduled broadcasting date and time according to the distribution request are registered. The VOD server included in the total package program distribution unit 32 distributes the program contents and advertisement contents of the total package program with advertisement according to the distribution request to the broadcasting station computer 2 through the public network 1 or the like at predetermined timing (step S23). Since the program contents include time zones where the advertisement contents are to be inserted in some places, the VOD server distributes the program contents and advertisement contents to the broadcasting station computer 2 while inserting the advertisement contents into such time zones.

The broadcasting station computer 2 receives the program contents and advertisement contents from the VOD server and stores them in the broadcasting contents storage unit 21. The program contents and advertisement contents are read from the broadcasting contents storage unit 21 and broadcasted on the scheduled broadcasting date and time.

Thus, a broadcasting station can be provided with a total package program with advertisement from the contents distribution center if predetermined conditions are satisfied, which makes it possible to avoid shortage of contents.

A description will now be made with reference to FIG. 8 on an example of a processing flow performed by the total package program distribution unit 32 and program advertisement frame processor 33 performed if the contents distribution center sells frame for program advertisements. First, the program advertisement frame processor 33 receives registration of frames for the program advertisement to be sold from the broadcasting station (step S31). For example, it receives the broadcasting station ID, scheduled broadcasting date and time, broadcasting area, and information on a flag that indicates whether or not there is an option for the total package program with advertisement as program advertisement frame information from the broadcasting station computer 2 through the public network 1 or the like. The information on the frame for the program advertisement may be received off-line from the broadcasting station. The program advertisement frame processor 33 registers the broadcasting station ID and program advertisement frame information into the program advertisement frame database 36. When the frame for the program advertisement is registered, it is disclosed to program frame advertiser for sale.

FIG. 9 shows an example of the data stored in the program advertisement frame database 36. In this example, broadcasting station ID, program advertisement frame ID, scheduled date and time, broadcasting area, and flag indicating whether or not there is an option for a total package program with advertisement are stored as program advertisement frame information, and an advertiser ID and an ID of advertisement contents for the program frame are stored as advertisement information. An alternative configuration may be employed in which the program advertisement frame ID are assigned by the program advertisement frame processor 33 at the time of registration. An option for a total package program with advertisement is a right to choose a total package program with advertisement to be broadcasted with the frame for program advertisement that has been purchased.

Next, the program advertisement frame processor 33 receives applications for the purchase of arbitrary frames for the program advertisement from a program frame advertiser (step S33). For example, an application for the purchase of a frame for the program advertisement includes a program advertisement frame ID, an advertiser ID, and a program frame advertisement contents ID for identifying advertisement contents for program frame. The program advertisement frame processor 33 judges whether a frame for the program advertisement that is specified by the purchase application is open (step S35). For example, it searches the program advertisement frame database 36 to check whether advertisement information has already been stored in correspondence with the program advertisement frame ID specified by the purchase application. If advertisement information has already been stored, the process returns to step S33 to select another frame. On the other hand, if the frame for program advertisement according to the purchase application is unoccupied, the program advertisement frame processor 33 registers the advertiser ID and program frame advertisement contents ID into the program advertisement frame database 36 in correspondence with the purchased frame for the program advertisement (step S37). An ID of the advertisement contents for the program frame may be assigned at the registration. Then, it receives information on the advertisement contents for program frame, which is specified by the ID of the advertisement contents for the program frame, for example, from the program frame advertiser computer 9 through the public network 1 or the like and registers it into the program frame advertisement contents storage unit 35 (step S39).

Next, the program advertisement frame processor 33 checks whether the purchased frame includes an option for the total package program with advertisement (step S41). If no option is included a distribution processing of the total package program is carried out by the total package program distribution unit 32 shown in FIG. 7 (step S43).

On the other hand, if an option for the total package program with advertisement is attached to the purchased frame, the total package program distribution unit 32 receives a distribution request including the ID of the selected total package program with advertisement from the program frame advertiser (step S47). The distribution request may be received from the program frame advertiser computer 9 through the public network 1 or the like. It may alternatively be received off-line and input to the total package program distribution unit 32. When the distribution request is carried out as a sequential process from step S33, information on when and who will broadcast (such as information on the broadcasting station ID, broadcasting area, and scheduled broadcasting date and time) is apparent from the program advertisement frame database 36. However, if the process is once terminated at step S39, for example, the distribution request made at step S47 must include information on the broadcasting station ID, broadcasting area, and scheduled broadcasting date and time.

Next, the total package program distribution unit 32 compares the broadcasting area of the frame for the program advertisement (which is acquired from the program advertisement frame database 36) with the broadcasting area code set for the total package program with advertisement, which is specified by the distribution request, and the scheduled broadcasting date and time of the frame for the program advertisement with the broadcasting period information of the advertisement set for the total package program with advertisement, which is specified by the distribution request (step S49). If the broadcasting area code of the advertisement set for the total package program with advertisement, which is specified by the distribution request, does not corresponds to the broadcasting area of the broadcasting station or does not include the broadcasting area of the frame for the program advertisement or if the broadcasting period information of the advertisement set for the total package program, which is specified by the distribution request, does not corresponds to the scheduled broadcasting date and time of the frame for the program advertisement or does not include the scheduled broadcasting date and time ("No" route at step S51), the total package program with advertisement can not be distributed to the broadcasting station specified by the distribution request. Therefore, a distribution rejection notice is transmitted (step S61). For example, the distribution rejection notice may be transmitted to the program frame advertiser computer 9 through the public network 1 or the like. The distribution rejection notice may alternatively be transmitted to the program frame advertiser by other means.

If the broadcasting area code of the advertisement set for the total package program, which is specified by the distribution request, corresponds to or includes the broadcasting area of the frame for the program advertisement and if the broadcasting period information of the advertisement set for the total package program, which is specified by the distribution request, corresponds to or includes the scheduled broadcasting date and time of the frame for the program advertisement ("Yes" route at step S51), the total package program distribution unit 32 checks whether any preceding distribution request for the same total package program with advertisement has been registered for the same broadcasting area and whether the scheduled broadcasting date and time according to this distribution request are within a predetermined period around the broadcast date and time of the registered preceding distribution request (step S53). For example, when the total package program information database 37 as shown in FIG. 6 is provided, the check at step S53 is carried out by using information on the broadcasting area according to the preceding distribution request and information on the scheduled broadcasting date and time.

If the conditions at step S53 are satisfied, that is, if there is any conflict between the distribution requests, the process proceeds to step S61 ("Yes" route at step S55). On the other hand if the conditions at step S53 are not satisfied or, that is, there is no conflict between the distribution requests ("No" route at step S55), the total package program distribution unit 32 registers the received distribution request into the total package program information database 37 (step S57). In the example of FIG. 6, the broadcasting station ID, broadcasting area, and scheduled broadcasting date and time of the frame for the program advertisement associated with the distribution request are registered. The VOD server included in the total package program distribution unit 32 distributes the program contents and advertisement contents of the total package program with advertisement for the distribution request to the broadcasting station computer 2 through the public network 1 or the like at predetermined timing (step S59). Since the program contents include time zones where the advertisement contents are to be inserted in some places, the VOD server distributes the program contents and advertisement contents to the broadcasting station computer 2 while inserting the advertisement contents in such time zones.

After step S43 or step S59, advertisement contents for the program frame are read out from the program frame advertisement contents storage unit 35 and distributed to the broadcasting station computer 2 at predetermined timing (step S45). The broadcasting station computer 2 receives the program contents, advertisement contents, and the advertisement contents for the program frame and stores them into the broadcasting contents storage unit 21. Such information is broadcasted on the scheduled broadcasting date and time.

Thus, a broadcasting station can broadly sell frames for the program advertisement through the contents distribution center to increase its profit. It is also able to get new advertiser.

A description will now be made with reference to FIG. 10 on a processing flow performed by the broadcasting station in case of selling frames for the program advertisement. As described with reference to FIG. 8, the broadcasting station sells frames for the program advertisement which may include an option for a total package program with advertisement (step S71). The frames for the program advertisement may be sold by using the broadcasting station computer 2 or other means. Next, it accepts applications for the purchase of arbitrary frames for the program advertisement from program frame advertisers (step S73). For example, this process may be carried out in a configuration in which a purchase application for a frame for the program advertisement including a program advertisement frame ID, an advertiser ID, and an ID of advertisement contents for the program frame for identifying the advertisement contents for the program frame may be received from the program frame advertiser computer 9 through the public network 1 or the like. Such an application may be accepted using other means.

The broadcasting station computer 2 judges whether the frame for the program advertisement, which is specified by the purchase application, is open (step S75). For example, it searches the program advertisement frame information storage unit 22 in which items similar to those in the program advertisement frame database 36 are stored excluding broadcasting station ID to check whether advertisement information has already been stored in correspondence with the program advertisement frame ID specified by the purchase application. If advertisement information has already been stored, the process returns to step S71 to select another advertisement frame. If the frame for the program advertisement specified by the purchase application is unoccupied, the broadcasting station computer 2 registers the advertiser ID and the ID of the advertisement contents for the program frame into the program advertisement frame information storage unit 22 in correspondence with the purchased frame for the program advertisement (step S77). Then, it receives information on the advertisement contents for the program frame, which correspond to the ID of the advertisement contents for the program frame, for example, from the program frame advertiser computer 9 through the public network 1 or the like and registers it into the broadcasting contents storage unit 21 (step S79).

The broadcasting station computer 2 checks whether or not an option for the total package program with advertisement is added to the purchased frame for the program advertisement (step S81). This can be achieved by checking whether or not a flag indicating the presence or absence of an option for the total package program with advertisement in the program advertisement frame information storage unit 22 is on. If no option is added to the purchased frame for the program advertisement, a distribution request including the broadcasting station ID, the ID of the total package program with advertisement selected by this broadcasting station, and information on the scheduled broadcasting date and time is transmitted to the contents distribution center system 3 (step S95). In the contents distribution center system 3, the total package program distribution unit 32 judges whether it can distribute the program (step S97). If it can not distribute, the broadcasting station computer 2 receives a distribution rejection notice from the contents distribution center system 3 (step S99). When the distribution rejection notice is received, the process returns to step S95 to select another total package program with advertisement and to transmit distribution request.

On the other hand when the total package program with advertisement, which is specified by the distribution request, can be distributed, the broadcasting station computer 2 receives the program contents and advertisement contents for the total package program with advertisement for the distribution request from the VOD server in the contents distribution center system 3 at predetermined timing and stored them into the broadcasting contents storage unit 21 (step S91). A distribution allowance notice may be received from the contents distribution center system 3 prior to step S91. The broadcasting station broadcasts the advertisement contents for the program frame, program contents, and advertisement contents on the scheduled broadcasting date and time (step S93).

On the other hand, if an option for the total package program with advertisement is attached, a selection information of a total package program with advertisement is received from the program frame advertiser computer 9 (step S83). In accordance with the selection, a distribution request including a broadcasting station ID, an ID of the total package program with advertisement selected by the program frame advertiser and information on the scheduled broadcasting date and time is transmitted to the contents distribution center system 3 (step S85). In the contents distribution center system 3, the total package program distribution unit 32 judges whether it can distribute the program. If not, the broadcasting station computer 2 receives a distribution rejection notice from the contents distribution center system 3 (step S89). When a distribution rejection notice is received, the process returns to step S83 to make the program frame advertiser to select another total package program with advertisement. If possible, the process proceeds to step S91.

Thus, a broadcasting station can sell frames for the program advertisement by itself to obtain income therefrom. Further, since it can receive distribution of total package programs with advertisement, shortage of program contents can be compensated, and cost reduction can be achieved.

The above-described embodiment is merely an example, and various modifications may be made to the present invention. For example, although the schematic system illustration in FIG. 4 shows the commercial advertiser computer 7 and the program frame advertiser computer 9 as separate computers, a single computer may be used to serve their functions. Further, those computers may be connected to each other through the Internet. The above-described functions of the contents distribution center system 3 may be achieved with a single computer or a plurality of computers. In addition, the above allocation of databases and storage devices has been shown as a matter of convenience of explanation, and it is not essential to follow such allocation. The functional modules in the contents distribution center system 3 are also shown by way of example, and it is not essential to follow such division of functions. The data shown in FIGS. 6 and 9 are also examples only, and a configuration may be employed in which a greater variety of data are stored.

Figure 8:
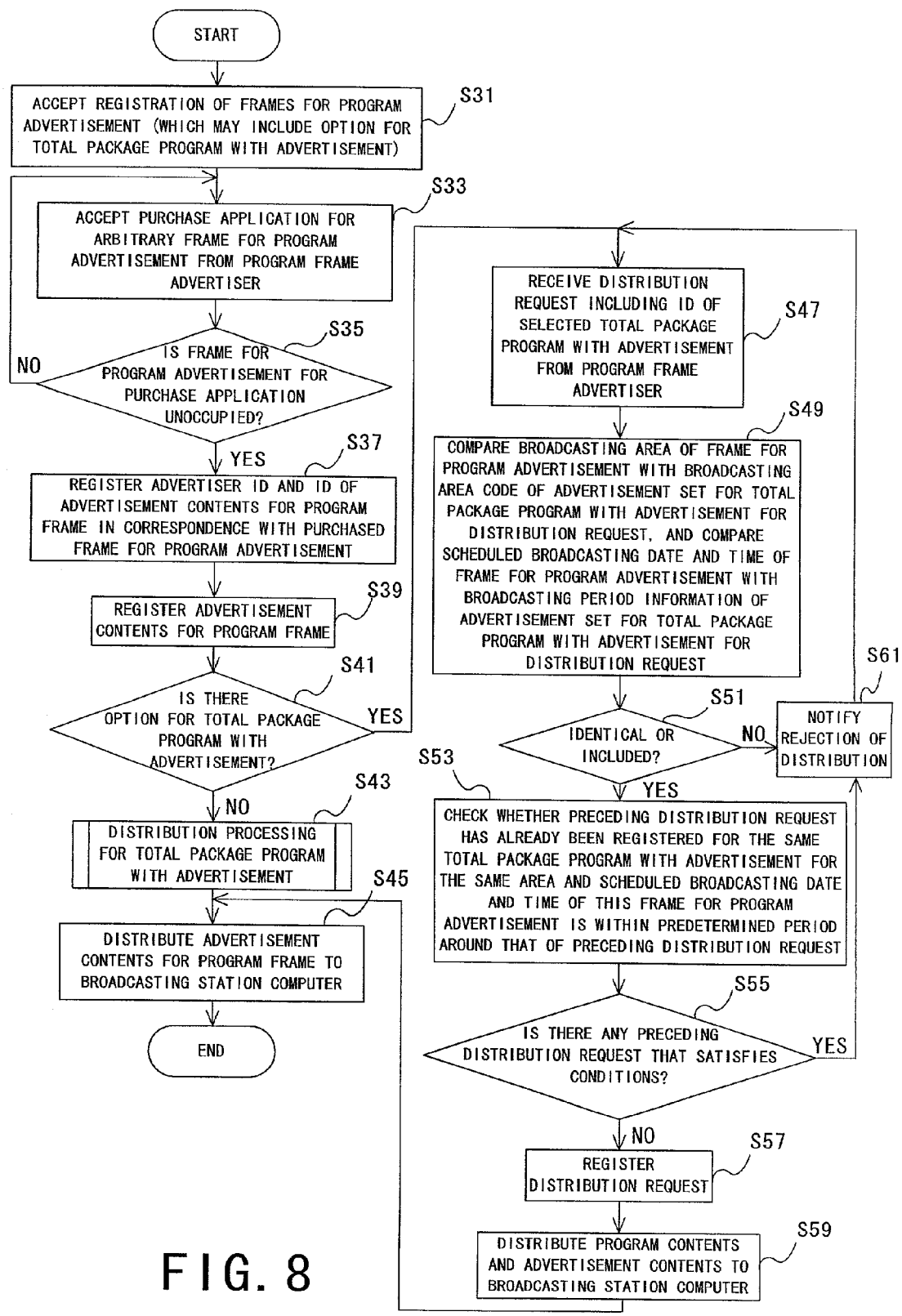
FIG. 8 is an illustration of an example of a third processing flow at the contents distribution center system.
Figure 10:
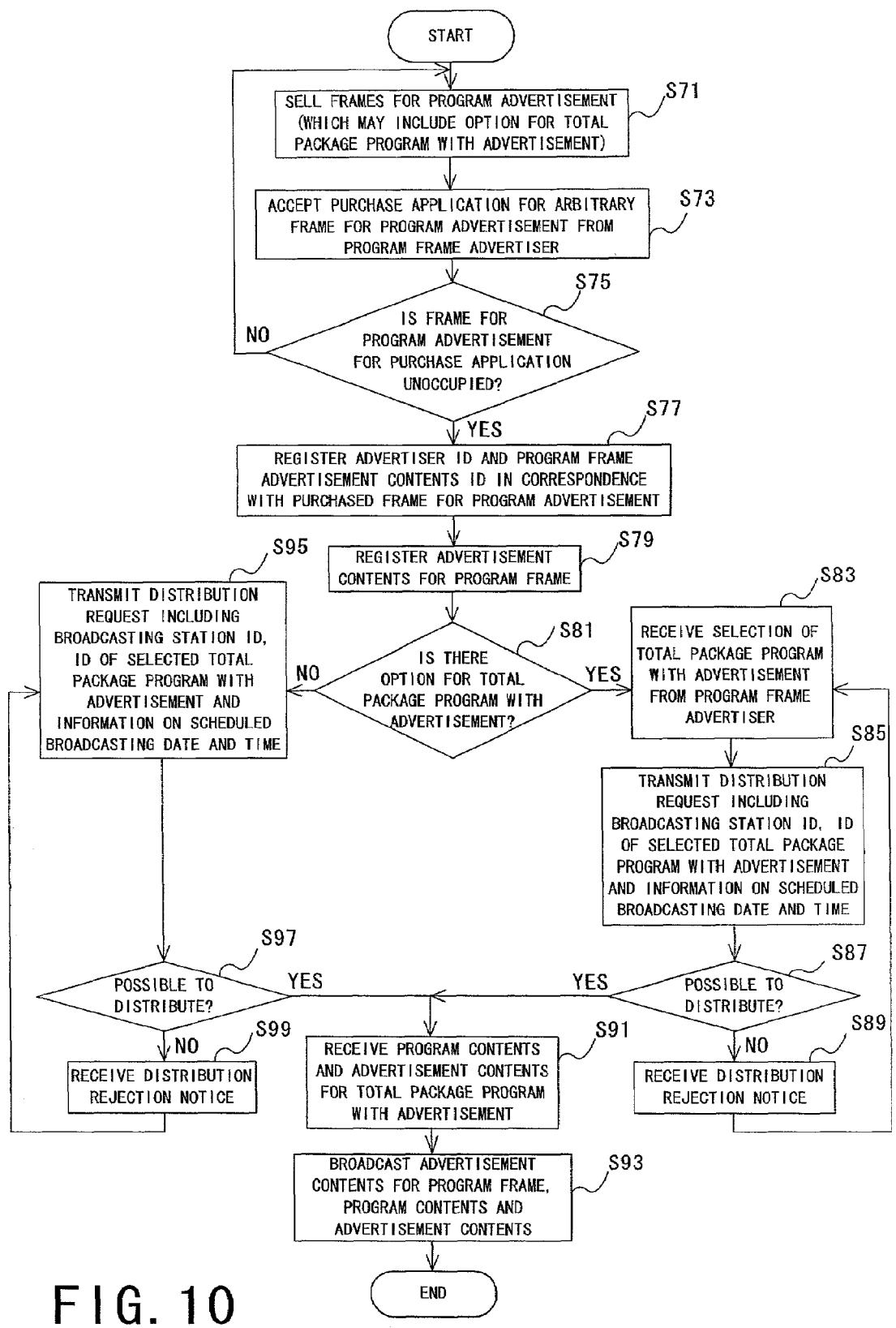
FIG. 10 is an illustration of an example of a processing flow at a broadcasting station computer.
Figure 11:
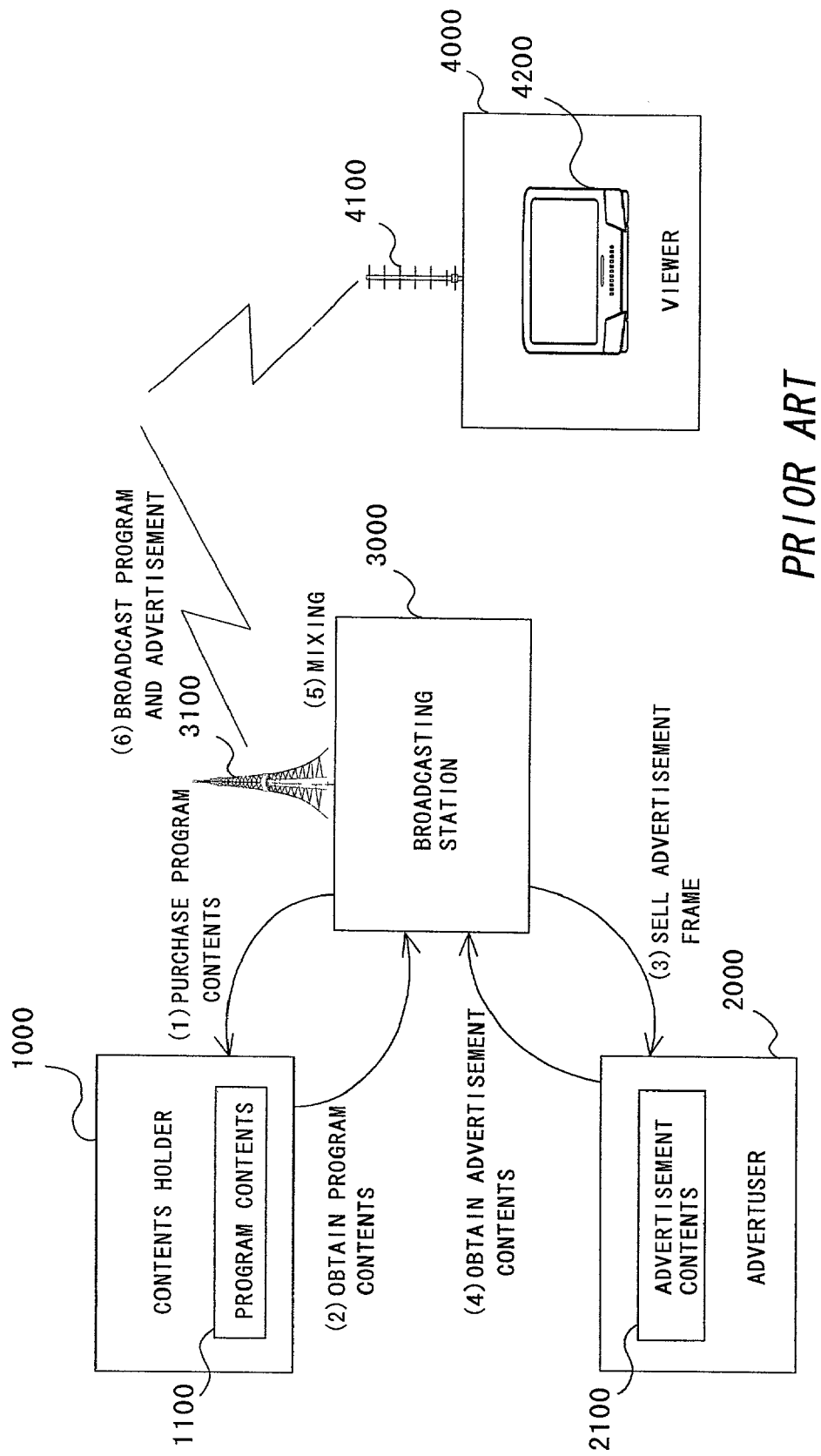
FIG. 11 is an illustration of a conventional business model.

Although FIGS. 8 and 10 show processing flows in which a total package program with advertisement for a certain program frame is determined after determining the program frame advertiser for the certain frame for the program advertisement, a processing flow may be employed in which the program advertiser for a certain frame for the program advertisement is determined after determining the total package program with advertisement for the certain frame for the program advertisement. Although FIGS. 8 and 10 show processing flows in case of selling frames for the program advertisement, the steps for selling a frame for the program advertisement are skipped if no frame for the program advertisement is sold.

Figure 7:
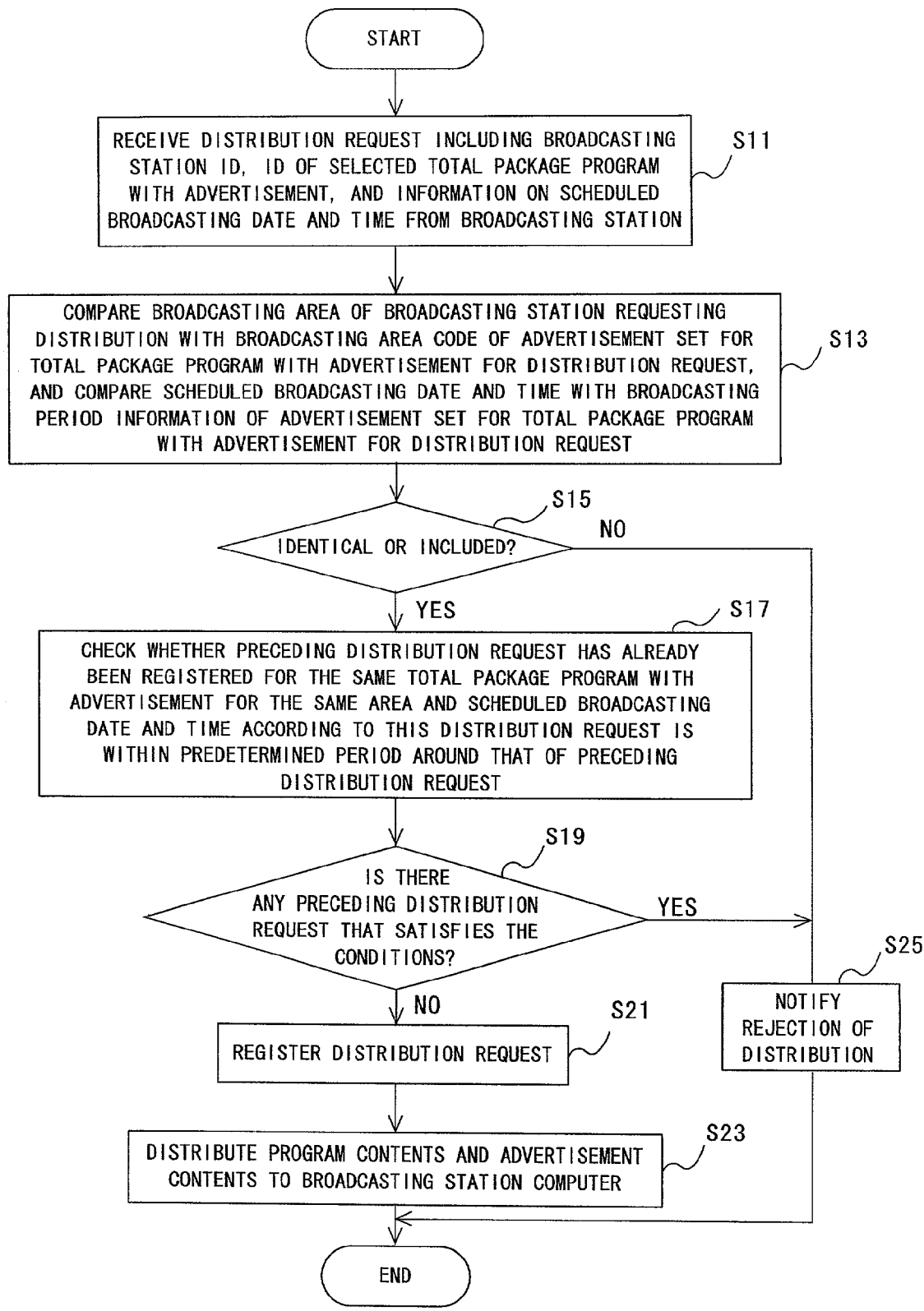
FIG. 7 is an illustration of an example of a second processing flow at the contents distribution center system.

Although FIGS. 7 and 8 show an implementation in which distribution of a total package program with advertisement for a distribution request is not permitted when the distribution request is in conflict with a preceding distribution request with regard to the broadcasting area and broadcasting date and time, for example, plural groups of advertisement contents may be prepared for one total package program with advertisement, and different advertisement contents may be inserted in the program contents to be distributed in the case of conflict.

A program for causing a computer to perform the above-described processing may be generated, and the program is stored in a storage medium or storage device such as a flexible disk, CD-ROM, magneto-optical disk, semiconductor memory or hard disk. It may be also distributed over a network. Results of intermediate processes are temporarily stored in a memory of a computer.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method for providing a total package program, said method comprising:

registering a broadcasting program;

registering, as information of a total package program, a condition regarding a broadcasting area, a condition regarding a broadcasting period, and information regarding an advertisement, which are specified by an advertiser, in association with said broadcasting program selected by said advertiser, for later distribution of said total package program, wherein said total package program is a combination of the selected broadcasting program and said advertisement;

receiving, from a broadcasting station, a distribution request for said total package program, said distribution request including at least identification information of said total package program, identification information of said broadcasting station, and information regarding a scheduled broadcasting time;

judging whether the broadcasting station satisfies the condition regarding the broadcasting area and the scheduled broadcasting time satisfies the condition regarding said broadcasting period; and if it is judged that said condition regarding the broadcasting area and the condition regarding the broadcasting period are satisfied, transmitting said total package program specified by said received distribution request, to said broadcasting station specified by said received distribution request, wherein said condition regarding said broadcasting period is a condition that said information regarding said scheduled broadcasting time included in said received distribution request does not contradict said information regarding said broadcasting period registered in association with said total package program specified by said received distribution request, and said condition regarding said broadcasting area is a condition that the broadcasting area of said broadcasting station specified by said received distribution request does not contradict said information regarding said broadcasting area registered in association with said total package program specified by said distribution request.

2. The method as set forth in claim 1, wherein if a preceding distribution request including said identification information of said total package program specified by said received distribution request has already been received and distribution of the specified total package program has already been determined, said condition regarding said broadcasting area is a condition that and said broadcasting area of said broadcasting station relating to said received distribution request, does not conflict with second broadcasting area of a second broadcasting station relating to said preceding distribution request, and said condition regarding said broadcasting period is a condition that said scheduled broadcasting time relating to said received distribution request, does not conflict with a second scheduled broadcasting time relating to said preceding distribution request.

3. The method as set forth in claim 1, wherein if a preceding distribution request including said identification information of said total package program specified by said received distribution request has already been received and distribution of the specified total package program has already been determined, said condition regarding said broadcasting area is a condition that said broadcasting area of said broadcasting station relating to said received distribution request, does not conflict with a second broadcasting area of a second broadcasting station relating to said preceding distribution request, and said condition regarding said broadcasting period is a condition that said scheduled broadcasting time relating to said received distribution request, does not conflict with a second scheduled broadcasting time relating to said preceding distribution request.

4. The method as set forth in claim 1, further comprising:
registering an advertisement frame provided in association with a program frame of said broadcasting station; and
registering information regarding an advertisement of a second advertiser for an arbitrary advertisement frame selected by said second advertiser.

5. The method as set forth in claim 4, wherein identification information of said total package program for said received distribution request is specified by said second advertiser.

6. The method as set forth in claim 4, further comprising:
registering contents information of said broadcasting program;
registering contents information of an advertisement for said total package program;
wherein said transmitting comprises:
transmitting information for said total package program specified by said received distribution request, to a computer for said broadcasting station specified by said received distribution request while inserting said contents information of said advertisement for said total package program specified by said received distribution request, into said contents information of the corresponding broadcasting program; and
transmitting contents information of an advertisement registered for said advertisement frame provided in association with said program frame specified by said scheduled broadcasting time specified by said received distribution request, to said computer for said broadcasting station specified by said received distribution request.

7. The method as set forth in claim 1, further comprising:
registering contents information of said broadcasting program;
registering contents information of an advertisement for said total package program; and
wherein said transmitting comprises transmitting information for said total package program specified by said received distribution request, to a computer for said broadcasting station specified by said received distribution request while inserting said contents information of said advertisement for said total package program specified by said received distribution request, into said contents information of the corresponding broadcasting program.

8. A program embodied on a medium, for causing a computer to provide a total package program with advertisement, said program comprising:
registering a broadcasting program;
registering, as information of a total package program, a condition regarding a broadcasting area, a condition regarding a broadcasting period, and information regarding an advertisement, which are specified by an advertiser, in association with said broadcasting program selected by said advertiser, for later distribution of said total package program, wherein said total package program is a combination of the selected broadcasting program and said advertisement;
receiving, from a broadcasting station, a distribution request for said total package program, said distribution request including at least identification information of said total package program, identification information of said broadcasting station, and information regarding a scheduled broadcasting time;
judging whether the broadcasting station satisfies the condition regarding the broadcasting area and the scheduled broadcasting time satisfies the condition regarding said broadcasting period; and
if it is judged that said condition regarding the broadcasting area and the condition regarding the broadcasting period are satisfied, transmitting said total package program specified by said received distribution request, to said broadcasting station specified by said received distribution request, wherein said condition regarding said broadcasting period is a condition that said information regarding said scheduled broadcasting time included in said received distribution request does not contradict said information regarding said broadcasting period registered in association with said total package program specified by said received distribution request, and said condition regarding said broadcasting area is a condition that the broadcasting area of said broadcasting station specified by said received distribution request does not contradict said information regarding said broadcasting area registered in association with said total package program specified by said distribution request.

9. The program as set forth in claim 8, wherein if a preceding distribution request including said identification information of said total package program specified by said received distribution request has already been received and distribution of the specified total package program has already been determined, said condition regarding said broadcasting area is a condition that and said broadcasting area of said broadcasting station relating to said received distribution request, does not conflict with second broadcasting area of a second broadcasting station relating to said preceding distribution request, and said condition regarding said broadcasting period is a condition that said scheduled broadcasting time relating to said received distribution request, does not conflict with a second scheduled broadcasting time relating to said preceding distribution request.

10. The program as set forth in claim 8, wherein if a preceding distribution request including said identification information of said total package program specified by said received distribution request has already been received and distribution of the specified total package program has already been determined, said condition regarding said broadcasting area is a condition that said broadcasting area of said broadcasting station relating to said received distribution request, does not conflict with a second broadcasting area of a second broadcasting station relating to said preceding distribution request, and said condition regarding said broadcasting period is a condition that said scheduled broadcasting time relating to said received distribution request, does not conflict with a second scheduled broadcasting time relating to said preceding distribution request.

11. The program as set forth in claim 8, further comprising:
registering an advertisement frame provided in association with a program frame of said broadcasting station; and
registering information regarding an advertisement of a second advertiser for an arbitrary advertisement frame selected by said second advertiser.

12. The program as set forth in claim 11, wherein identification information of said total package program for said received distribution request is specified by said second advertiser.

13. The program as set forth in claim 11, further comprising:
registering contents information of said broadcasting program;
registering contents information of an advertisement for said total package program;
wherein said transmitting comprises:
transmitting information for said total package program specified by said received distribution request, to a computer for said broadcasting station specified by said received distribution request while inserting said contents information of said advertisement for said total package program specified by said received distribution request, into said contents information of the corresponding broadcasting program; and
transmitting contents information of an advertisement registered for said advertisement frame provided in association with said program frame specified by said scheduled broadcasting time specified by said received distribution request, to said computer for said broadcasting station specified by said received distribution request.

14. The program as set forth in claim 8, further comprising:
registering contents information of said broadcasting program;
registering contents information of an advertisement for said total package program; and
wherein said transmitting comprises transmitting information for said total package program specified by said received distribution request, to a computer for said broadcasting station specified by said received distribution request while inserting said contents information of said advertisement for said total package program specified by said received distribution request, into said contents information of the corresponding broadcasting program.

15. A system for providing a total package program with advertisement, comprising:
means for registering a broadcasting program;
means for registering, as information of a total package program, a condition regarding a broadcasting area, a condition regarding a broadcasting period, and information regarding an advertisement, which are specified by an advertiser, in association with said broadcasting program selected by said advertiser, for later distribution of said total package program, wherein said total package program is a combination of the selected broadcasting program and said advertisement;
means for receiving, from a broadcasting station, a distribution request for said total package program, said distribution request including at least identification information of said total package program, identification information of said broadcasting station, and information regarding a scheduled broadcasting time;
means for judging whether the broadcasting station satisfies the condition regarding the broadcasting area and the scheduled broadcasting time satisfies the condition regarding said broadcasting period; and
if it is judged that said condition regarding the broadcasting area and the condition regarding the broadcasting period are satisfied, transmitting said total package program specified by said received distribution request, to said broadcasting station specified by said received distribution request,
wherein said condition regarding said broadcasting period is a condition that said information regarding said scheduled broadcasting time included in said received distribution request does not contradict said information regarding said broadcasting period registered in association with said total package program specified by said received distribution request, and said condition regarding said broadcasting area is a condition that the broadcasting area of said broadcasting station specified by said received distribution request does not contradict said information regarding said broadcasting area registered in association with said total package program specified by said distribution request.

16. The system as set forth in claim 15, wherein if a preceding distribution request including said identification information of said total package program specified by said received distribution request has already been received and distribution of the specified total package program has already been determined, said condition regarding said broadcasting area is a condition that and said broadcasting area of said broadcasting station relating to said received distribution request, does not conflict with second broadcasting area of a second broadcasting station relating to said preceding distribution request.

17. The system as set forth in claim 15, wherein if a preceding distribution request including said identification information of said total package program specified by said received distribution request has already been received and distribution of the specified total package program has already been determined, said condition regarding said broadcasting area is a condition that said broadcasting area of said broadcasting station relating to said received distribution request, does not conflict with a second broadcasting area of a second broadcasting station relating to said preceding distribution request, and said condition regarding said broadcasting period is a condition that said scheduled broadcasting time relating to said received distribution request, does not conflict with a second scheduled broadcasting time relating to said preceding distribution request.

18. The system as set forth in claim 15, further comprising:
registering an advertisement frame provided in association with a program frame of said broadcasting station; and
registering information regarding an advertisement of a second advertiser for an arbitrary advertisement frame selected by said second advertiser.

19. The system as set forth in claim 18, wherein identification information of said total package program for said received distribution request is specified by said second advertiser.

20. The system as set forth in claim 18, further comprising:
registering contents information of said broadcasting program;
registering contents information of an advertisement for said total package program;
wherein said transmitting comprises:
transmitting information for said total package program specified by said received distribution request, to a computer for said broadcasting station specified by said received distribution request while inserting said contents information of said advertisement for said total package program specified by said received distribution request, into said contents information of the corresponding broadcasting program; and
transmitting contents information of an advertisement registered for said advertisement frame provided in association with said program frame specified by said scheduled broadcasting time specified by said received distribution request, to said computer for said broadcasting station specified by said received distribution request.

21. The system as set forth in claim 15, further comprising:
means for registering contents information of said broadcasting program;
means for registering contents information of an advertisement for said total package program; and
wherein said transmitting comprises transmitting information for said total package program specified by said received distribution request, to a computer for said broadcasting station specified by said received distribution request while inserting said contents information of said advertisement for said total package program specified by said received distribution request, into said contents information of the corresponding broadcasting program.

22. A method for providing a total package program, said method comprising:
registering a broadcasting program, on a condition that a royalty is to be paid if selected by an advertiser;
registering, as information of a total package program, information regarding an advertisement specified by an advertiser on a charged basis, in association with a broadcasting program selected by said advertiser, for later distribution of said total package program, wherein said total package program is a combination of the selected broadcasting program and said advertisement;
receiving, from a broadcasting station, a distribution request specifying the total package program, a broadcasting station, and a broadcasting time;
judging whether the broadcasting station satisfies a condition regarding a broadcasting area and the broadcasting time satisfies a condition regarding a broadcasting period; and
if it is judged that said condition regarding the broadcasting area and the condition regarding the broadcasting period are satisfied, transmitting said total package program specified by said received distribution request to said broadcasting station specified by said received distribution request on a free-of-charge basis;
wherein said condition regarding said broadcasting period is a condition that said information regarding said scheduled broadcasting time included in said received distribution request does not contradict said information regarding said broadcasting period registered in association with said total package program specified by said received distribution request, and said condition regarding said broadcasting area is a condition that the broadcasting area of said broadcasting station specified by said received distribution request does not contradict said information regarding said broadcasting area registered in association with said total package program specified by said distribution request.

23. The method as set forth in claim 22, further comprising:
registering an advertisement frame provided in association with a program frame of a broadcasting station; and
registering information regarding an advertisement of a second advertiser for an arbitrary advertisement frame selected by said second advertiser.

24. The method as set forth in claim 23, wherein the total package program to be specified by said distribution request is specified by said second advertiser.

* * * * *

UNITED STATES PATENT AND TRADEMARK OFFICE
CERTIFICATE OF CORRECTION

PATENT NO.         : 7,415,514 B2
APPLICATION NO. : 09/947760
DATED              : August 19, 2008
INVENTOR(S)        : Ichiyou Shiga It is certified that error appears in the above-identified patent and that said Letters Patent is hereby corrected as shown below:

Title Page, Column 1, under (Item 65)
"(65)           Prior Publication Data

US 2002/0194254 A1   Dec. 19, 2002"

insert

--(30)      Foreign Application Priority Data

June 8, 2001   (JP) ........................... 2001-174332--.

Signed and Sealed this

Eleventh Day of November, 2008

JON W. DUDAS
*Director of the United States Patent and Trademark Office*